United States Patent
Fabien et al.

(10) Patent No.: US 10,119,479 B2
(45) Date of Patent: Nov. 6, 2018

(54) METHODS AND SYSTEMS FOR BOOST CONTROL BASED ON EXHAUST PRESSURE GREATER THAN A THRESHOLD

(71) Applicant: Ford Global Technologies, LLC, Dearborn, MI (US)

(72) Inventors: Philip Andrew Fabien, Livonia, MI (US); Stephen George Russ, Canton, MI (US); Michael A. Mancini, Ypsilanti, MI (US); Jonathan Cherry, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 503 days.

(21) Appl. No.: 14/820,409

(22) Filed: Aug. 6, 2015

(65) Prior Publication Data

US 2017/0037786 A1    Feb. 9, 2017

(51) Int. Cl.

| | |
|---|---|
| *F02B 37/00* | (2006.01) |
| *F02B 37/12* | (2006.01) |
| *F02D 9/02* | (2006.01) |
| *F02D 13/02* | (2006.01) |
| *F01N 3/021* | (2006.01) |

(Continued)

(52) U.S. Cl.
CPC .............. *F02D 9/02* (2013.01); *F02B 37/18* (2013.01); *F02B 37/183* (2013.01); *F02B 37/225* (2013.01); *F02D 13/0261* (2013.01); *F02D 41/0007* (2013.01); *F02D 41/145* (2013.01); *F01N 3/021* (2013.01); *F01N 11/002* (2013.01); *F01N 2260/14* (2013.01); *F01N 2560/06* (2013.01); *F01N 2560/07* (2013.01); *F01N 2560/08* (2013.01); *F01N 2900/1404* (2013.01); *F01N 2900/1406* (2013.01); *F01N 2900/1411* (2013.01); *F02D 41/1448* (2013.01); *F02D 41/18* (2013.01); *F02D 2009/0228* (2013.01); *F02D 2041/001* (2013.01); *F02D 2200/0406* (2013.01); *F02D 2200/0414* (2013.01); *F02D 2200/0812* (2013.01); *F02D 2200/501* (2013.01); *Y02T 10/144* (2013.01)

(58) Field of Classification Search
CPC ....... F02D 2009/022; F02D 2009/0235; F02D 2250/34; F02B 37/00–37/24
See application file for complete search history.

(56) References Cited

U.S. PATENT DOCUMENTS

| | | |
|---|---|---|
| 6,708,104 B2 | 3/2004 | Avery, Jr. et al. |
| 8,572,961 B2 | 11/2013 | Karnik et al. |

(Continued)

OTHER PUBLICATIONS

Li, Y. "Route and Traffic Information-Based Evap System Leak Test Initiation," U.S. Appl. No. 14/455,742, filed Aug. 8, 2014, 59 pages.

(Continued)

*Primary Examiner* — Laert Dounis
(74) *Attorney, Agent, or Firm* — Julia Voutyras; McCoy Russell LLP

(57) ABSTRACT

Methods and systems are provided for mitigating excessive exhaust pressures in an engine. In one example, a method may include adjusting an intake throttle responsive to exhaust pressure upstream of an exhaust turbine being higher than a threshold without reducing boost level. In this way, boost pressures may be maintained while reducing exhaust pressures.

18 Claims, 7 Drawing Sheets

(51) Int. Cl.
*F02D 41/00* (2006.01)
*F02B 37/18* (2006.01)
*F02B 37/22* (2006.01)
F02D 41/14 (2006.01)
F02D 41/18 (2006.01)
F01N 11/00 (2006.01)

(56) References Cited

U.S. PATENT DOCUMENTS

| | | |
|---|---|---|
| 8,621,864 B2 | 1/2014 | Osburn et al. |
| 2003/0023367 A1* | 1/2003 | Avery, Jr. ............... F01N 3/023 701/110 |
| 2004/0103648 A1* | 6/2004 | Opris .................... F01N 3/0231 60/285 |
| 2007/0220866 A1* | 9/2007 | Nishiumi ................ F01N 3/023 60/286 |
| 2008/0196395 A1* | 8/2008 | Hashizume ............. F01N 3/023 60/295 |
| 2011/0041493 A1* | 2/2011 | Doering ............... F02D 41/0007 60/603 |
| 2012/0023932 A1* | 2/2012 | Ge ...................... F02D 41/0007 60/602 |
| 2015/0121862 A1* | 5/2015 | Wade ...................... F02B 37/22 60/602 |

OTHER PUBLICATIONS

Xiao, B. et al. "Methods and Systems for Boost Control," U.S. Appl. No. 14/799,289, filed Jul. 14, 2014, 34 pages.

* cited by examiner

METHODS AND SYSTEMS FOR BOOST CONTROL BASED ON EXHAUST PRESSURE GREATER THAN A THRESHOLD

FIELD

The present application relates to methods and systems for reducing exhaust backpressure issues in a turbocharged engine system.

BACKGROUND AND SUMMARY

Engine systems may be configured with boosting devices, such as turbochargers or superchargers, for providing a boosted aircharge and improving peak power outputs. The boost pressure may be regulated to a desired set-point through the actions of one or more boost actuators including, for example, a wastegate (WG) coupled across an exhaust turbine and a compressor recirculation valve (CRV) coupled across an intake compressor. The wastegate regulates boost pressure by controlling exhaust gas flow over the exhaust turbine while the compressor recirculation valve is used for compressor surge management. Each boost actuator may be adjusted based on feed-forward and feedback components.

In such boosted engine systems, the presence of high exhaust backpressure can cause one or more exhaust valves of the engine to be held open or forced open when they are commanded to be closed. This unintentional opening of exhaust valves can lead to abnormal combustion events such as misfires, knock, and/or pre-ignition. As such, this can degrade engine performance, as well as reduce the life of various engine components. In addition, engine exhaust emissions may be adversely affected.

One approach for controlling exhaust backpressures in boosted engine systems is shown by Osburn et al. in U.S. Pat. No. 8,621,864. Therein, exhaust gas recirculation (EGR) flow is adjusted to regulate intake air flow based on an existing exhaust pressure. Specifically, intake air flow may be modified by altering EGR flow to regulate exhaust pressure. The EGR flow may be adjusted by one or more of an EGR valve and a variable geometry turbocharger (VGT). The VGT may be controlled to adjust EGR flow based on the existing exhaust pressure and a desired exhaust pressure.

However, the inventors herein have recognized a potential issue with such an approach to controlling exhaust pressures. As one example, adjusting EGR flow may produce changes to intake air flow at a slower than desired rate. To elaborate, intake air flow may respond at a slower rate to variations in EGR flow. As such, higher exhaust backpressures may need to be decreased rapidly in order to reduce abnormal combustion events and their effects on component degradation. Thus, EGR flow adjustments may not avert issues resulting from excessive exhaust backpressures in a prompt manner.

In one example, the issues described above may be at least partly addressed by a method for controlling a boosted engine system comprising: adjusting an intake throttle responsive to pre-turbine exhaust pressure being greater than a threshold without reducing boost level and while maintaining valve timing. In this way, exhaust backpressure in a boosted engine system may be maintained within a range that does not degrade engine hardware and performance.

As one example, a boosted engine system may include a turbocharger and a particulate filter coupled downstream of an exhaust turbine of the turbocharger. A post-turbine exhaust manifold pressure may be measured by a pressure sensor coupled downstream of the turbine. A pre-turbine exhaust pressure may be estimated (that is, predicted or modeled) based on various engine operating conditions including, for example, a load of the particulate filter and/or the post-turbine exhaust pressure. In response to the pre-turbine pressure becoming greater than a threshold, such as a threshold above which the exhaust pressure can hold or force open a cylinder exhaust valve, intake air flow to the engine may be restricted without reducing boost output and while maintaining exhaust valve timing. For example, an intake throttle opening may be reduced to clip the engine intake air flow. A torque control loop of an engine controller may then use the reduced intake airflow as an input to adjust one or more boost actuators to maintain the boost pressure despite the reduced intake air flow.

In this way, excessive exhaust backpressures may be reduced. By adjusting the intake throttle to regulate intake air flow, a faster reduction in intake air charge may be obtained. Thereby, occurrence of abnormal combustion events due to excessive exhaust backpressures may be diminished allowing for improved engine performance and increased durability of engine components. Further, by maintaining boost levels during the lowering of intake air charge, vehicle operator experience may not be degraded. Overall, drivability and emissions compliance may be enhanced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
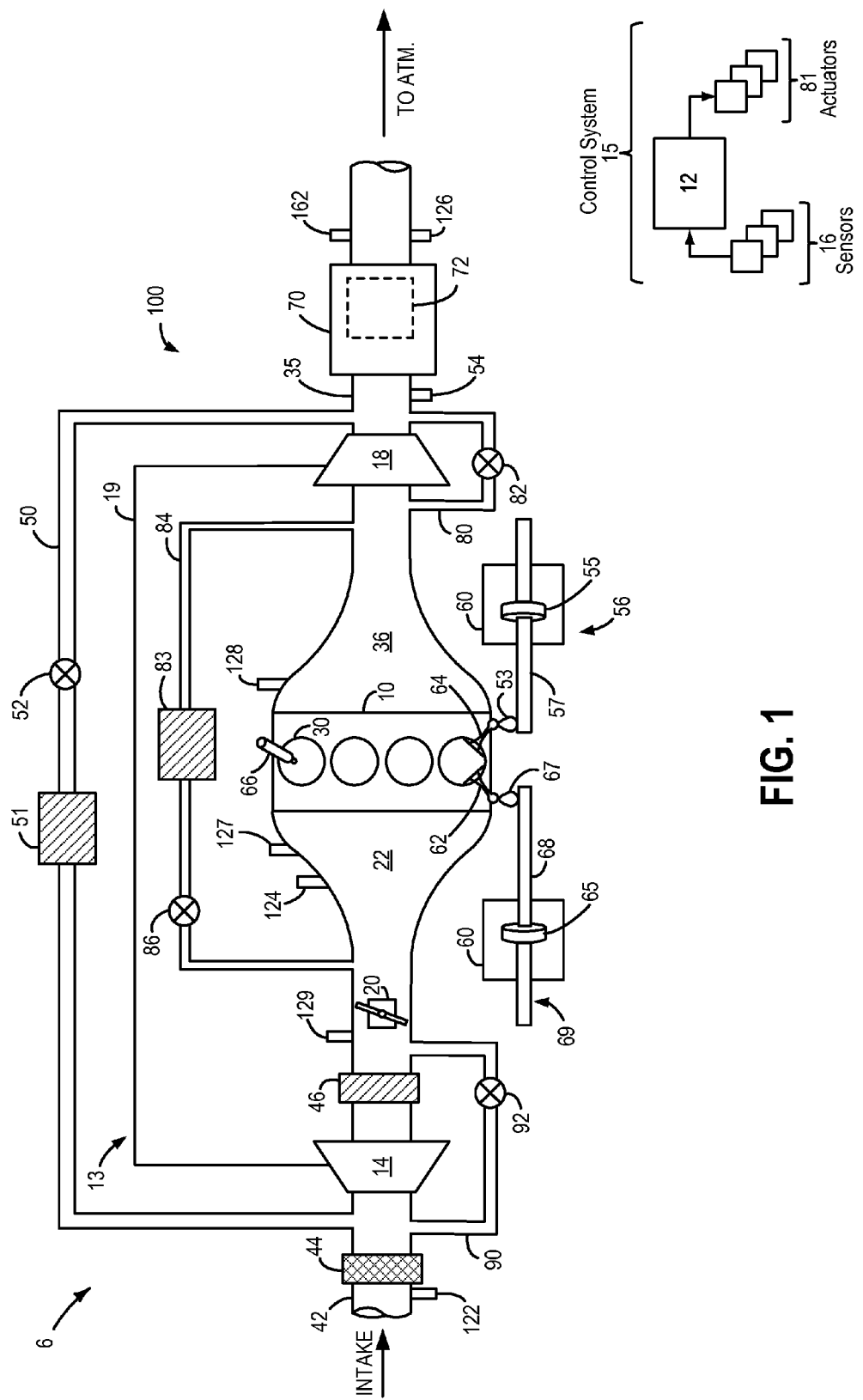
FIG. 1 is a schematic depiction of an example engine system in a vehicle.
Figure 4:
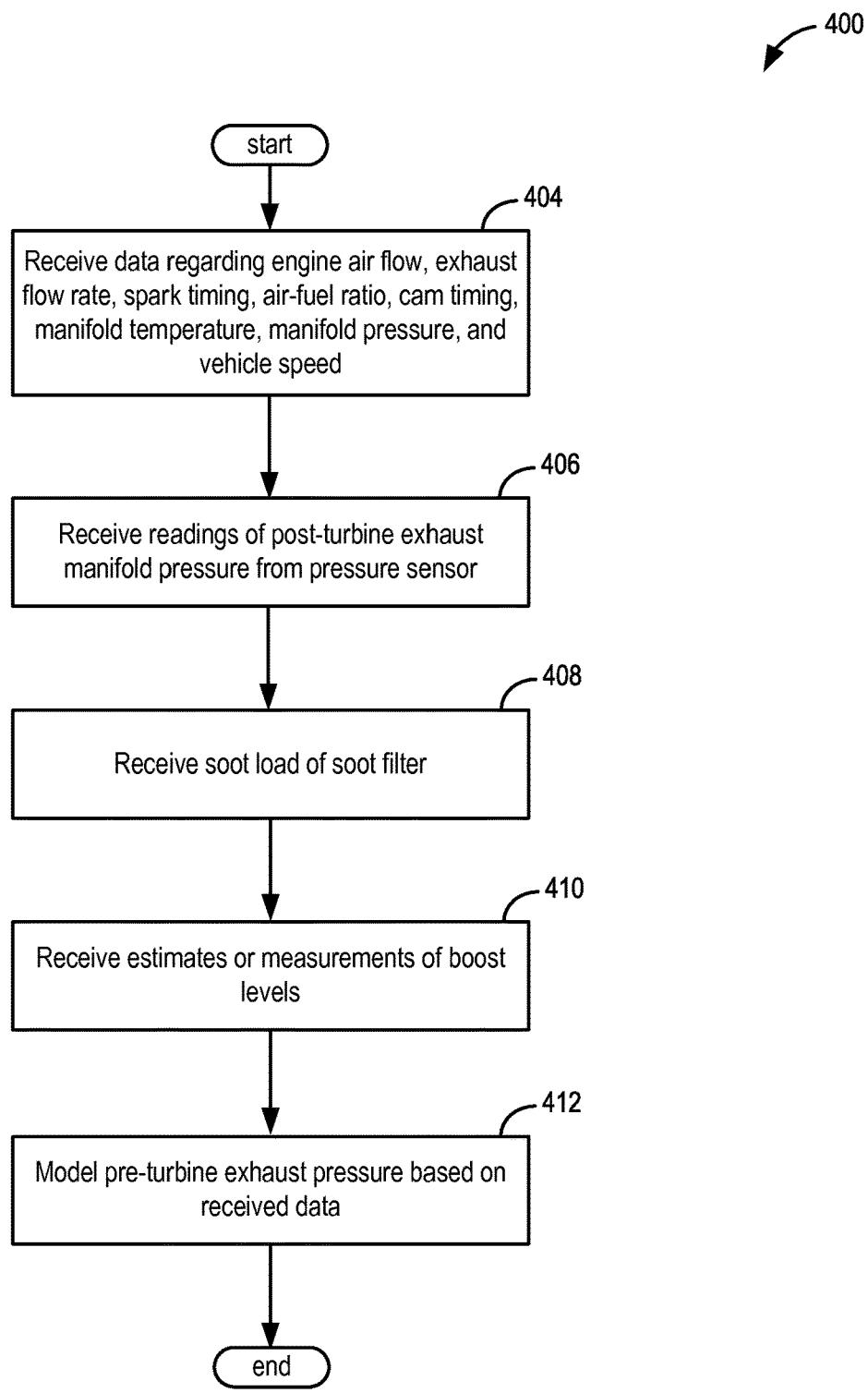
FIG. 4 portrays an example flowchart for predicting exhaust pressure upstream of an exhaust turbine coupled in the engine system of FIG. 1.
Figure 5:
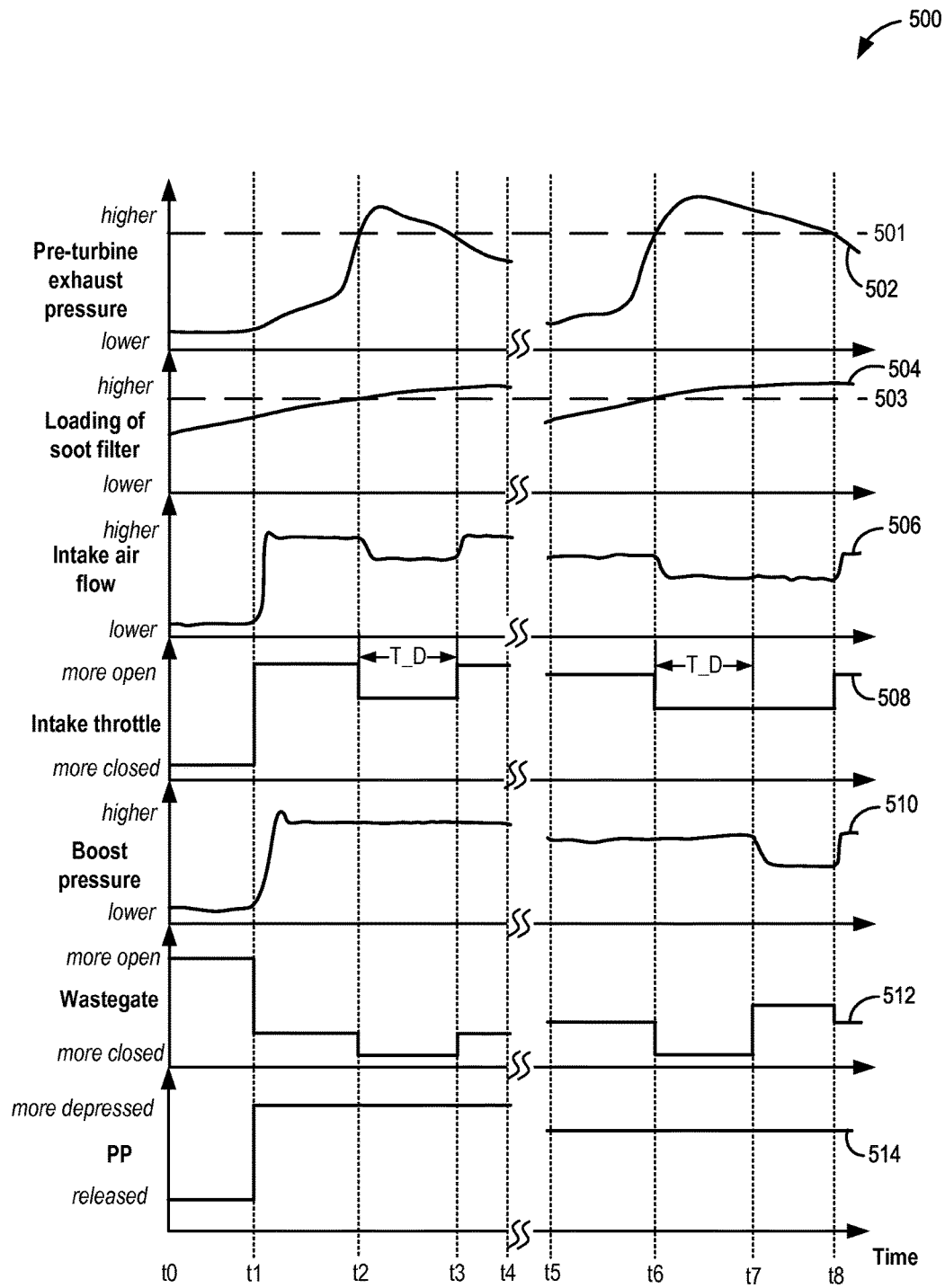
FIG. 5 presents example adjustments to an intake throttle and an exhaust wastegate in response to higher exhaust pressures upstream of the exhaust turbine.

The following description relates to systems and methods for controlling exhaust backpressure in an engine system, such as the example engine system of FIG. 1. As such, the example engine may be a turbocharged engine wherein exhaust pressure upstream of an exhaust turbine may be modeled based on a plurality of engine operating parameters (FIG. 4). Excessive exhaust pressure upstream of the exhaust turbine may force open exhaust valves of engine cylinders resulting in combustion instabilities and degradation of engine components. Accordingly, when the exhaust pressure upstream of the exhaust turbine is higher than a threshold, a controller may be configured to activate a routine, such as that shown in FIGS. 3A-3B, to reduce intake air flow. The intake air flow may be clipped based on a control loop (FIG. 2) causing a reduction in available torque. The clip in intake air flow may be achieved by reducing an opening of an intake throttle. Additionally or alternatively, blow-through of boosted intake air into an exhaust manifold upstream of the exhaust turbine (e.g. via positive valve overlap) may be reduced. Concurrent to the reduction in intake air flow and available torque, a desired boost pressure may be maintained by actuating various boost actuators such as a wastegate, a compressor recirculation valve, etc. If the reduction in intake air flow does not result in a reduction of exhaust pressure within a pre-determined duration, boost levels may then be lowered (FIG. 5). In this way, excessive exhaust backpressures may be quickly mitigated.

Turning now to FIG. 1, it shows a schematic depiction of a vehicle system 6. The vehicle system 6 includes an engine system 100. The engine system 100 includes an engine 10 having a plurality of cylinders 30. In the depicted embodiment, engine 10 is a boosted engine coupled to a turbocharger 13 including a compressor 14 driven by a turbine 18. Fresh air is introduced along intake passage 42 into engine 10 via air cleaner 44 and flows to compressor 14. A flow rate of ambient air that enters intake passage 42 may be sensed by mass air flow (MAF) sensor 122.

Compressor 14 may be any suitable intake-air compressor, such as a motor-driven or driveshaft driven supercharger compressor. In engine system 10, however, the compressor is a turbocharger compressor mechanically coupled to turbine 18 via a shaft 19, the turbine 18 driven by expanding engine exhaust. Turbine 18 may thus be termed an exhaust turbine 18. In one embodiment, the compressor and turbine may be coupled within a twin scroll turbocharger. In another embodiment, the turbocharger may be a variable geometry turbocharger (VGT), where turbine geometry is actively varied as a function of engine speed.

As shown in FIG. 1, compressor 14 is coupled, through charge-air cooler 46 to intake throttle 20. Charge-air cooler 46 may cool a temperature of compressed air exiting compressor 14. The charge-air cooler may be an air-to-air or air-to-water heat exchanger, for example. Intake throttle 20 arranged downstream of compressor 14 is fluidically coupled to intake manifold 22. Intake throttle 20 may include a throttle plate, and in one example, a position of the intake throttle 20 (specifically, a position of the throttle plate) may be varied by controller 12 via a signal provided to an electric motor or actuator included with intake throttle 20, a configuration that is commonly referred to as electronic throttle control (ETC). In this manner, intake throttle 20 may be operated to vary an amount of intake air provided to intake manifold 22 of engine 10 and the plurality of cylinders therein.

In the embodiment shown in FIG. 1, the pressure of the air charge within the intake manifold 22 is sensed by manifold air pressure (MAP) sensor 124. Further, a temperature of the air charge within intake manifold 22 is measured by manifold air temperature (MAT) sensor 127. Further, a pressure of compressed air upstream of intake throttle 20 and downstream of compressor 14 may be sensed by throttle inlet pressure (TIP) sensor 129. Specifically, boost levels in engine system 100 may be measured by TIP sensor 129 via measuring TIP (also termed, boost pressure).

A compressor bypass valve 92 may be coupled in a compressor bypass passage 90 across from (e.g., between the inlet and the outlet of) compressor 14. The compressor bypass valve 92 may be a normally closed valve configured to open under selected operating conditions to relieve excess boost pressure. For example, the compressor bypass valve may be opened during conditions of decreasing engine speed to reduce compressor surge. To reduce compressor surge, at least a portion of the air charge compressed by compressor 14 may be recirculated from the compressor outlet to the compressor inlet via compressor bypass passage 90. Specifically, in the depicted example, compressed air from downstream of charge-air cooler 46 may be recirculated to the compressor inlet. In alternative examples, compressed air from downstream of compressor 14 but upstream of charge-air cooler 46 may be diverted via compressor bypass passage 90 towards the compressor inlet. Compressor bypass valve 92 (also termed, compressor recirculation valve CRV 92) may control an amount of compressed air recirculated from the compressor outlet to the compressor inlet. As such, compressor bypass valve (CBV) 92 may be commanded by controller 12 to a desired position based on a desired amount of compressor recirculation flow whereupon an actuator (e.g., electric, hydraulic, etc.) may actuate the compressor bypass valve 92. It will be appreciated that the CRV 92 may also be controlled to regulate boost pressures. For example, during a tip-in event, CRV 92 may be adjusted to a more closed (e.g., fully closed) position to enable a rapid rise in boost pressure. Herein, compressor bypass flow may be disabled or reduced significantly. Thus, the CRV may be a boost actuator.

Intake manifold 22 is fluidically coupled to a series of combustion chambers 30 (or plurality of cylinders 30) through a series of intake valves (series not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold section may enable effluent from different combustion chambers to be directed to different locations in the engine system.

Combustion chambers 30 may be supplied one or more fuels, such as gasoline, alcohol fuel blends, diesel, biodiesel, compressed natural gas, etc. Fuel may be supplied to the combustion chambers via fuel injector 66. In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition.

Exhaust from exhaust manifold 36 is directed to turbine 18 to drive the turbine. Exhaust gas sensor 128 is shown coupled to exhaust manifold 36 upstream of emission control device 70. Sensor 128 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a NOx, HC, or CO sensor.

It will be appreciated that in the depicted example engine system 100 does not include a pressure sensor positioned upstream of turbine 18. Alternative example engine systems may include a sensor for sensing pre-turbine exhaust pressure (or exhaust backpressure). Engine system 100, however, does include a pressure sensor 54 positioned immediately downstream of exhaust turbine 18 along exhaust conduit 35. Pressure sensor 54 may measure exhaust pressure downstream of exhaust turbine 18 or post-turbine exhaust pressure.

Exhaust gases exiting combustion chambers 30 and exhaust manifold 36 spin exhaust turbine 18 which is coupled to compressor 14 via shaft 19. The amount of compression provided to one or more cylinders of the engine via turbocharger 13 may be varied by controller 12. When reduced turbine torque is desired, some exhaust flow may be redirected through a wastegate 82 bypassing the turbine. Wastegate 82 (also termed, exhaust wastegate) may be coupled across exhaust turbine 18 in turbocharger 13. Specifically, wastegate 82 may be included in a bypass passage 80 coupled between an inlet and outlet of the exhaust turbine 18. By adjusting a position of wastegate 82 via controller 12, an amount of boost provided by the turbocharger may be controlled. Thus, the wastegate may be a boost actuator. Herein, controller 12 may provide a signal based on the desired boost to adjust an electromechanical actuator coupled to wastegate 82. The combined flow from the turbine 18 and the wastegate 82 may then flow through emission control device 70.

In general, one or more emission control devices 70 may include one or more exhaust after-treatment catalysts configured to catalytically treat the exhaust flow, and thereby reduce an amount of one or more substances in the exhaust flow. For example, the emission control device 70 may include a regeneratable soot filter 72 (also termed, particulate filter 72) configured to trap and oxidize soot particles in the exhaust flow. Particulate filter 72 may treat exhaust gases and trap soot as well as ash particles within the particulate filter. In some embodiments, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. All or part of the treated exhaust from emission control device 70 and particulate filter 72 may be released into the atmosphere via exhaust conduit 35.

Exhaust conduit 35 may also include exhaust gas sensor 162 and a temperature sensor 126. Downstream exhaust gas sensor 162 may be any suitable sensor for providing an indication of a concentration of exhaust gas constituents such as a $NO_x$, $NH_3$, EGO, etc. In the depicted example, sensor 162 may be a particulate matter (PM) sensor. As shown in FIG. 1, sensor 162 may be located downstream of particulate filter 72 while in other embodiments, sensor 162 may be positioned upstream of particulate filter 72. Further, it will be appreciated that more than one sensor 162 may be provided in any suitable position. Specifically, sensor 162 may measure the mass or concentration of particulate matter downstream of particulate filter 72, and downstream of emission control device 70. As such, sensor 162 may be a soot sensor. Sensor 162 may be operatively coupled to controller 12 and may communicate with controller 12 to indicate a concentration of particulate matter within exhaust exiting particulate filter 72 (and emission control device 70) and flowing through exhaust conduit 35. Herein, sensor 162 may also estimate loading of particulate filter 72.

Depending on operating conditions, a portion of exhaust gases may be recirculated from the exhaust conduit 35, downstream of turbine 18, to intake passage 42, upstream of compressor 14 via exhaust gas recirculation (EGR) passage 50. The portion of exhaust gases may flow through EGR passage 50 via EGR cooler 51 and LP_EGR valve 52. In this manner, low pressure exhaust gas recirculation (LP-EGR) may be enabled. In some embodiments, in addition to the LP-EGR, high pressure exhaust gas recirculation (HP-EGR) may also be enabled wherein a portion of exhaust is recirculated from the exhaust manifold 36, from upstream of turbine 18, to intake manifold 22, downstream of compressor 14 via a distinct and separate high pressure EGR passage 84 and therein coupled EGR cooler 83 and HP-EGR valve 86. LP-EGR valve 52 and HP-EGR valve 86 may be opened (e.g., an opening of the EGR valves may be increased) to admit a controlled amount of cooled exhaust gas to the intake passage for desirable combustion and emissions-control performance. As such, EGR valve 52 may be actuated by an actuator (e.g., electric, mechanical, hydraulic, etc.) based on commands received from controller 12.

Each cylinder 30 may be serviced by one or more valves. In the present example, each cylinder 30 includes a corresponding intake valve 62 and an exhaust valve 64. Each intake valve 62 and exhaust valve 64 may be held at a desired position via a corresponding spring. Engine system 100 further includes one or more camshafts 57, 68 for operating intake valve 62 and/or for operating exhaust valve 64. In the depicted example, intake camshaft 68 is coupled to intake valve 62 and can be actuated to operate intake valve 62. Likewise, exhaust camshaft 57 is coupled to exhaust valve 64 and can be actuated to operate exhaust valve 64. In some embodiments, where the intake valve of a plurality of cylinders 30 are coupled to a common camshaft, intake camshaft 68 can be actuated to operate the intake valves of all the coupled cylinders.

Intake valve 62 is actuatable between an open position that allows intake air into the corresponding cylinder and a closed position substantially blocking intake air from the cylinder. Intake camshaft 68 may be included in intake valve actuation system 69. Intake camshaft 68 includes intake cam 67 which has a cam lobe profile for opening intake valve 62 for a defined intake duration. In some embodiments (not shown), the camshaft may include additional intake cams with an alternate cam lobe profile that allows the intake valve 62 to be opened for an alternate duration (herein also referred to as a cam profile switching system). Based on the lobe profile of the additional cam, the alternate duration may be longer or shorter than the defined intake duration of intake cam 67. The lobe profile may affect cam lift height, cam duration, and/or cam timing. A controller may be able to switch the intake valve duration by moving intake camshaft 68 longitudinally and switching between cam profiles.

In the same manner, each exhaust valve 64 is actuatable between an open position allowing exhaust gas out of the corresponding cylinder and a closed position substantially retaining gas within the cylinder and blocking the exit of exhaust gases from the cylinder. Exhaust camshaft 57 may be included in exhaust valve actuation system 56. As depicted, exhaust camshaft 57 includes exhaust cam 53 which has a cam lobe profile for opening exhaust valve 64 for a defined exhaust duration. In some embodiments, where the exhaust valve of a plurality of cylinders 30 is coupled to a common camshaft, the exhaust camshaft 57 can be actuated to operate the exhaust valves of all the coupled cylinders. In some embodiments, the exhaust camshaft may further include additional exhaust cams with an alternate cam lobe profile that allows exhaust valve 64 to be opened for an alternate duration. The lobe profile may affect cam lift height, cam duration, and/or cam timing. A controller may be able to switch the exhaust valve duration by moving the exhaust camshaft longitudinally and switching between cam profiles.

It will be appreciated that the intake and/or exhaust camshafts may be coupled to cylinder subsets, and multiple intake and/or exhaust camshafts may be present. For example, a first intake camshaft may be coupled to the intake valves of a first subset of cylinders while a second intake camshaft may be coupled to the intake valves of a second subset of cylinders. Likewise, a first exhaust camshaft may be coupled to the exhaust valves of a first subset of cylinders while a second exhaust camshaft may be coupled to the exhaust valves of a second subset of cylinders. Further still, one or more intake valves and exhaust valves may be coupled to each camshaft. The subset of cylinders coupled to the camshaft may be based on their position along an engine block, their firing order, the engine configuration, etc.

Intake valve actuation system 69 and exhaust valve actuation system 56 may further include push rods, rocker arms, tappets, etc. Such devices and features may control actuation of the intake valve 62 and the exhaust valve 64 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 30 may each have more than one exhaust valve and/or intake valve. In still other examples, each of the exhaust valve 64 and intake valve 62 of one or more cylinders may be actuated by a common camshaft. Further still, in some examples, some of the intake valves 62 and/or exhaust valves 64 may be actuated by their own independent camshaft or other device.

Engine system 100 may include variable valve timing systems, for example, variable cam timing VCT system 60. It will be noted that exhaust valve actuation system 56 is also operatively coupled to VCT system 60, which is depicted as a separate block in FIG. 1 for clarity. As such, VCT system 60 may be operatively and communicatively coupled to each of the intake valve actuation system 69 and exhaust valve actuation system 56.

A variable valve timing system may be configured to open a first valve for a first duration during a first operating mode. The first operating mode may occur at an engine load below a part engine load threshold. Further, the variable valve timing system may be configured to open the first valve for a second duration, shorter than the first duration, during a second operating mode. The second operating mode may occur at an engine load above an engine load threshold and an engine speed below an engine speed threshold (e.g., during low to mid engine speeds).

VCT system 60 may be a twin independent variable camshaft timing system, for changing intake valve timing and exhaust valve timing independently of each other. VCT system 60 may include an intake camshaft phaser 65 coupled to the common intake camshaft 68 for changing intake valve timing. The VCT system may likewise include an exhaust camshaft phaser 55 coupled to exhaust camshaft 57 for changing exhaust valve timing. VCT system 60 may be configured to advance or retard valve timing by advancing or retarding cam timing and may be controlled by controller 12. VCT system 60 may be configured to vary the timing of valve opening and closing events by varying the relationship between the crankshaft position and the camshaft position. For example, VCT system 60 may be configured to rotate intake camshaft 68 independently of the crankshaft to cause the valve timing to be advanced or retarded. In some embodiments, VCT system 60 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be hydraulically powered, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 60.

By adjusting VCT system 60, a position of intake camshaft 68 can be adjusted to thereby vary an opening and/or closing timing of intake valve 62. Similarly, a position of exhaust camshaft 57 can be adjusted by VCT system 60 to thereby vary an opening and/or closing timing of exhaust valve 64. As such, by varying the opening and closing of intake valve 62, an amount of positive overlap between intake valve 62 and exhaust valve 64 can be varied. For example, VCT system 60 may be adjusted to advance or retard an opening and/or a closing of intake valve 62 relative to a piston position.

During engine operation, a cylinder piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke. During cylinder combustion, an exhaust valve may be opened just as the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

Based on the timing differences between exhaust valve closing and intake valve opening, the valves may be operated with negative valve overlap wherein for a short duration after the end of the exhaust stroke and before the commencement of the intake stroke, both intake and exhaust valves are closed. This period, during which both valves are closed, is referred to as negative (intake to exhaust) valve overlap. In one example, the VCT system may be adjusted so that the negative intake to exhaust valve overlap timing may be a default cam position of the engine during cylinder combustion.

Alternatively, the valves may be operated with positive valve overlap wherein for a short duration before the end of the exhaust stroke and after the commencement of the intake stroke, both intake and exhaust valves may be open. This period, during which both valves (e.g., intake valves and exhaust valves of a given cylinder) may be open concurrently, is referred to as a positive (intake to exhaust) valve overlap. Positive valve overlap may be employed to expedite catalyst warm-up during a cold start. In another example, positive valve overlap in boosted engines (e.g., engines coupled to a turbocharger) may be utilized to reduce turbo lag. Herein, boosted air from the compressor may be streamed through one or more cylinders towards the exhaust turbine by increasing positive valve overlap.

As detailed herein, the VCT system 60 may be adjusted so that an amount of positive valve overlap during selected boosted engine operating conditions, e.g., when exhaust pressures are higher than desired, is decreased. As one example, a position of the intake camshaft may be adjusted such that an opening of the intake valve timing is retarded. Consequently, the intake valve may be opened at a later time (before the end of the exhaust stroke) such that a duration over which both valves are open may be decreased, leading to reduced positive valve overlap. As one example, positive valve overlap may be decreased by moving the intake camshaft from a position of more positive valve overlap to a position having lesser positive valve overlap. As another example, positive valve overlap may be lessened by moving the intake camshaft from a position of positive valve overlap to a position of negative valve overlap.

It will be appreciated that while the above example suggests decreasing positive valve overlap by retarding intake opening timing, in alternate examples, positive valve overlap may be decreased by adjusting an exhaust camshaft to advance exhaust valve closing. Further still, each of the intake and the exhaust camshafts may be adjusted to vary the positive valve overlap by varying both the intake and the exhaust valve timings. Further, adjustments to valve timings may be utilized to vary intake air flow into a corresponding cylinder.

The vehicle system 6 may further include control system 15. Control system 15 is shown including controller 12, which receives information and signals from a plurality of sensors 16 (various examples of which are described herein) of FIG. 1 and sends control signals to a plurality of actuators 81 (various examples of which are described herein). As controller 12 employs the various actuators of FIG. 1 to adjust engine operation based on the received signals and instructions stored on a memory of the controller. As one example, sensors 16 may include exhaust gas sensor 128 (such as a linear UEGO sensor) located upstream of the emission control device, post-turbine pressure sensor 54, and downstream exhaust gas sensor 162 (such as a particulate matter sensor). As another example, the actuators may include fuel injector 66, wastegate 82, EGR valve 52, CRV 92, and intake throttle 20. The controller 12 may receive input data from the various sensors, process the input data, and trigger the actuators in response to the processed input data based on instructions or code programmed therein corresponding to one or more routines. Example control routines are described herein with regard to FIGS. 3A-3B, and 4.

As described earlier, excessive exhaust pressure, particularly upstream of exhaust turbine 18 may force open one or more exhaust valves of the plurality of cylinders 30 from a fully closed position. For example, the exhaust valve may be closed during a compression stroke. Herein, inadvertent opening of the exhaust valve due to exhaust backpressure may reduce pressure within the associated cylinder causing a loss of power and efficiency. Accordingly, when exhaust pressure upstream of the exhaust turbine is estimated to be higher than a threshold pressure, the controller may command a reduction in intake air flow by adjusting a position of the intake throttle 20. By reducing intake air flow, exhaust pressure may be decreased. At the same time, boost pressure in the engine may be maintained by adjusting one or more boost actuators such as the CRV and the wastegate.

Figure 2:
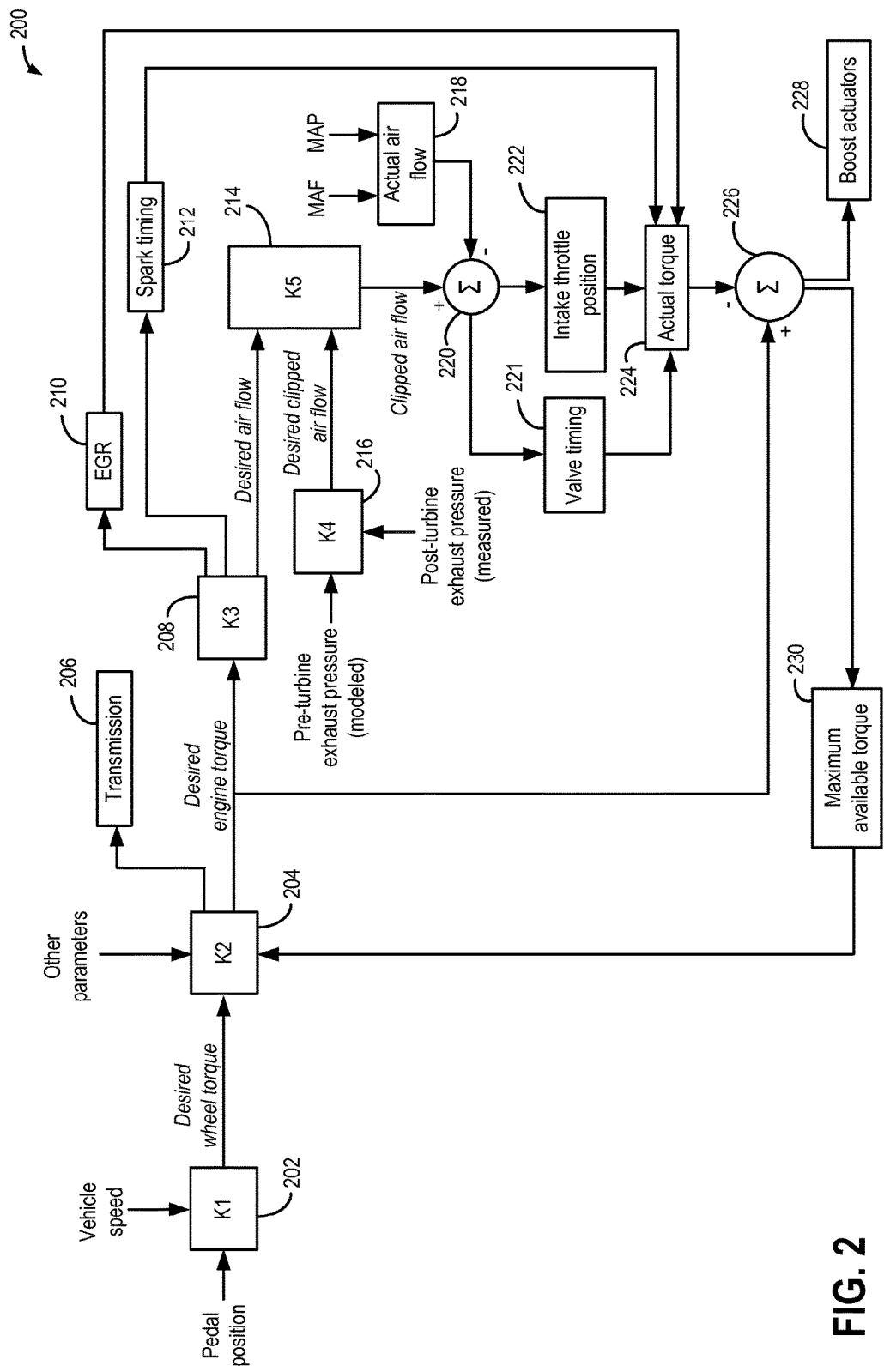
FIG. 2 depicts an example control loop for determining an intake air flow clip and related torque reduction based on exhaust pressures.

FIG. 2 depicts an example control flow 200 for determining the reduction in intake air flow (e.g., clipped air flow) desired to remedy alleviate higher than desired exhaust pressures. Further, the example control flow also includes a torque control loop that uses the reduced intake airflow as an input to adjust one or more boost actuators to maintain the boost pressure despite the reduced intake air flow. A controller, such as controller 12 of FIG. 1, may execute the control flow based on signals received from various sensors of the engine system (e.g., engine system 100). Further, various actuators described in reference to FIG. 1 may be employed to perform adjustments to engine operation.

Control flow 200 commences by estimating a desired wheel torque. Controller K1 at 202 calculates the desired wheel torque based on inputs of a vehicle speed and a pedal position (e.g., accelerator pedal position). Based on the calculated desired wheel torque and other additional parameters, such as ambient conditions, emission control device status, etc., as well as a maximum available torque, controller K2 at 204 determines a desired engine torque which is provided to controller K3. Controller K2 also provides input regarding the desired wheel torque to a transmission at 206. Accordingly, based on the input provided to the transmission, a desired gear may be selected. Further, controller K3 at 208 uses the input of the desired engine torque to adjust each of EGR at 210 and spark timing at 212. Specifically, an amount of EGR flow may be modified responsive to the desired engine torque. As such, EGR flow may be LP-EGR and/or HP-EGR. Similarly, spark timing may be adjusted, e.g. advanced or retarded, to provide the desired engine torque. Though not shown, controller K3 may also provide input to a fuel injection system for a desired air-fuel ratio based on the desired engine torque.

In addition to adjusting the EGR flow and spark timing, controller K3 determines a desired air flow into the engine. This desired intake air flow into the engine may be supplied to controller K5 at 214. Simultaneously, controller K4 at 216 determines a desired clipped air flow based on inputs regarding exhaust pressure. As mentioned earlier, excessive exhaust pressures in the exhaust manifold upstream of the exhaust turbine may adversely affect engine performance. In order to reduce exhaust pressures, the control flow 200 may actuate mitigating actions such as clipping the intake air flow. Controller K4 receives inputs related to the pre-turbine exhaust pressure and a post-turbine exhaust pressure. The pre-turbine exhaust pressure is the exhaust pressure upstream of the exhaust turbine, such as turbine 18 of FIG. 1. As will be described later in reference to FIG. 4, the pre-turbine exhaust pressure may be modeled based on a plurality of engine and vehicle parameters. As such, the pre-turbine exhaust pressure may not be estimated by a pressure sensor. On the other hand, exhaust pressure downstream of the exhaust turbine may be measured by a pressure sensor, such as sensor 54 of FIG. 1. The pre-turbine exhaust pressure and the post-turbine exhaust pressure are utilized by controller K4 at 216 to determine the desired clipped air flow.

At 214, controller K5 determines the clip to the intake air flow based on the desired air flow and the desired clipped air flow. The clipped air flow is compared to an existing actual air flow at 220 to determine intake throttle position 222 and desired valve timing 221. Thus, intake air flow may be clipped by varying a position of the intake throttle and/or by adjusting valve timings. The actual air flow at 218 may be based on readings from the MAF sensor and the MAP sensor. At 224, the actual engine torque is determined based on the intake throttle position, valve timing, EGR flow, spark timing, and other parameters. The actual engine torque is compared to the desired engine torque at 226 to determine the maximum available torque at 230. Further, the maximum available torque also determines adjustments to one or more boost actuators at 228. For example, the boost actuators may be adjusted to maintain the desired boost pressures. Further still, the maximum available torque serves as an input to controller K2 to determine the desired engine torque. Based on the limited torque that is available, additional strategies may be incorporated by the engine controller. For example, transmission shift strategies may be modified based on the maximum available torque.

It will be appreciated that the various controllers introduced above in the control flow, e.g., controllers K1, K2, etc. may be part of controller 12. Further, clipped intake air flow may also be obtained by adjusting intake valve timings and/or intake cam timings.

Figure 3A:
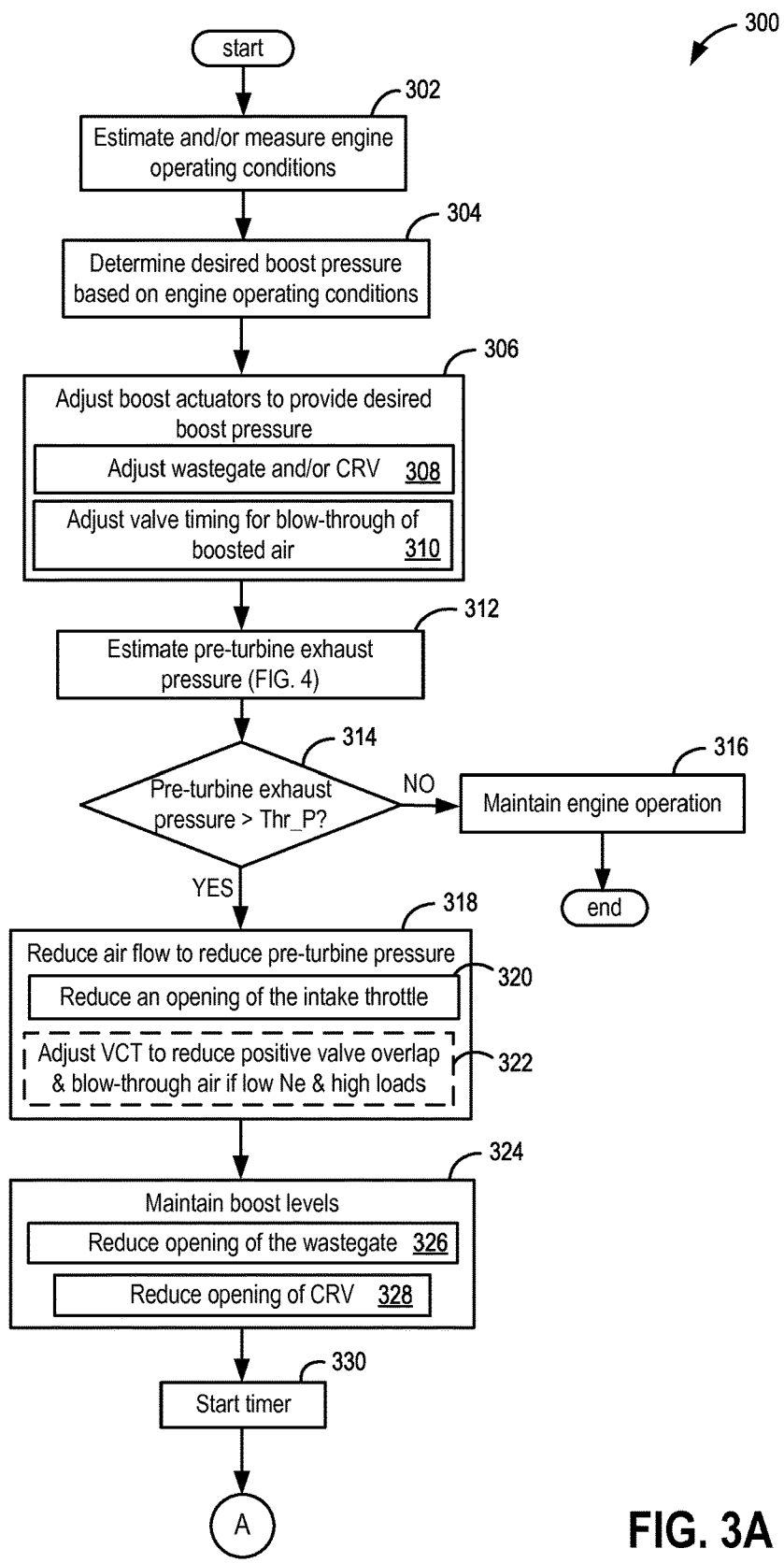
FIGS. 3A and 3B illustrate an example flow chart for adjusting intake air flow in response to excessive exhaust pressure.
Figure 3B:
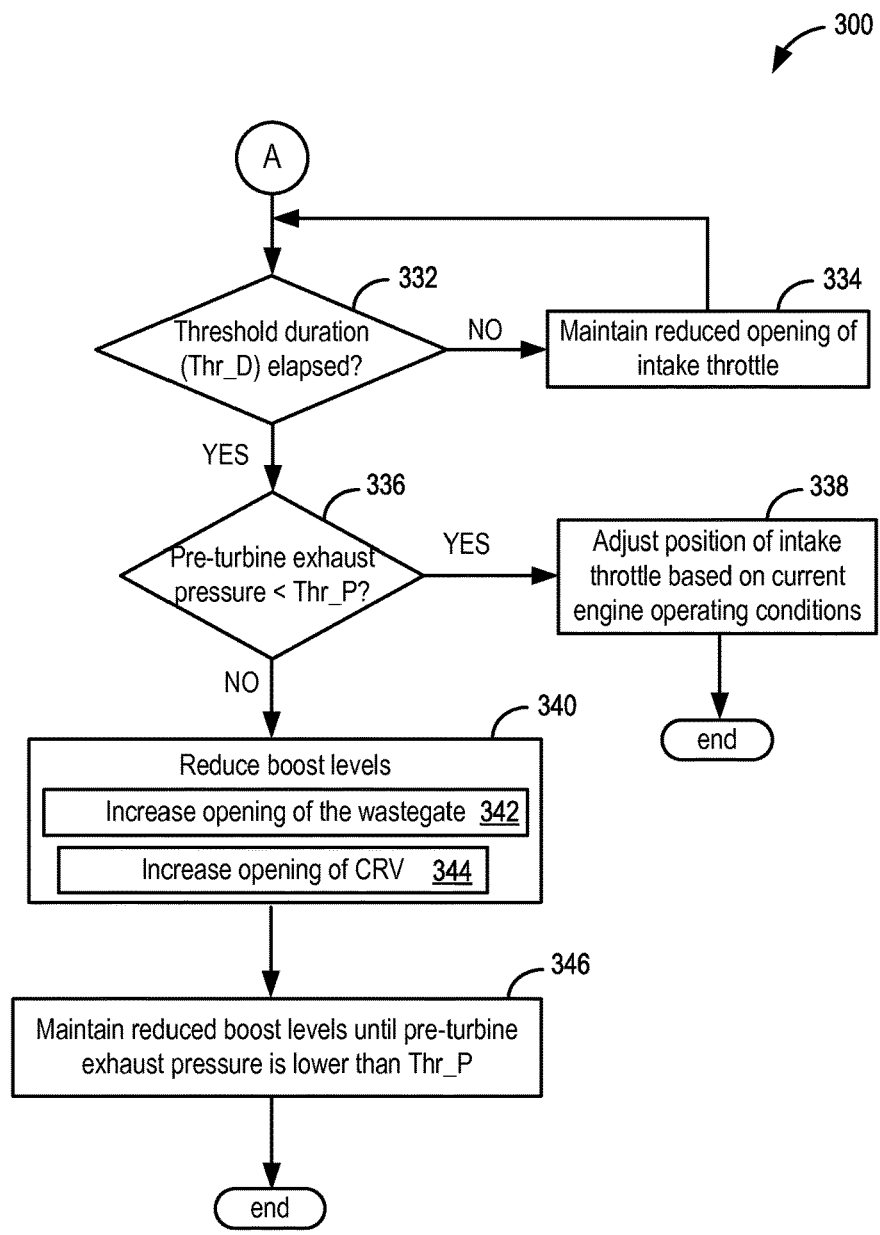

Turning now to FIGS. 3A and 3B, they depict example routine 300 illustrating adjustments to intake air flow in response to excessive exhaust pressure upstream of an exhaust turbine in an engine. Specifically, intake air flow is reduced by adjusting a position of an intake throttle. Concurrently, boost levels in the engine may be maintained by modifying positions of one or more boost actuators. As such, routine 300 (and routine 400 of FIG. 4) will be described in relation to the engine system shown in FIG. 1, but it should be understood that similar routines may be used with other systems without departing from the scope of this disclosure. Instructions for carrying out routine 300, as well as routine 400, included herein may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system, such as the actuators of FIG. 1 to adjust engine operation, according to the routines described below.

At 302, routine 300 estimates and/or measures existing engine operating conditions. Engine operating conditions may include engine speed, torque demand, air-fuel ratio, manifold absolute pressure (MAP), mass airflow, engine temperature, etc. For example, engine speed may be estimated based on output from a crankshaft sensor. Next, at 304, routine 300 determines a desired boost pressure based on existing engine conditions. For example, if the torque demand is higher than a torque threshold, such as during a tip-in event, a higher boost pressure may be demanded. In another example, during deceleration events, lower (or no) boost levels may be desired.

In response to the desired boost pressure, one or more boost actuators such as the wastegate and/or the CRV may be adjusted at 308. For example, if a higher boost pressure is desired, an opening of the wastegate may be decreased such that a larger proportion of exhaust gases are directed to the exhaust turbine. As an example, the controller may send a control signal to an electromechanical actuator coupled to the wastegate to rotate the wastegate to a more closed position from a more open position. Similarly, the CRV may be adjusted from a more open position to a more closed position to decrease an opening of the CRV. Herein, the controller may send a control signal to an electromechanical actuator coupled to the CRV to shift the CRV to a more closed position. By closing the CRV, the flow of compressed air through the compressor bypass passage may be significantly blocked allowing for a rise in boost pressure. On the other hand, if lower boost pressure is desired, the opening of the wastegate may be increased to allow a greater amount of exhaust gases to bypass the exhaust turbine. Additionally or alternatively, the CRV may be adjusted to a more open position from a more closed position to enable a higher flow of compressed air via the compressor bypass passage. Herein, a larger amount of boosted air may be diverted away from the intake throttle and engine cylinders causing a reduction in boost pressure.

In addition to adjusting the boost actuators, at 310, valve timing may be altered to enable or disable blow-through of boosted air. As an example, if higher boost levels are demanded, positive valve overlap between an intake valve and an exhaust valve of a given cylinder (or more cylinders) may be increased. For example, a cylinder intake cam and/or intake valve timing can be adjusted from a current timing (e.g., a timing corresponding to negative valve overlap) to a timing that enables positive valve overlap. In another example, a higher amount of positive valve overlap may be provided. The controller may communicate with a valve timing system of the engine to utilize cams, camshafts, and other actuators coupled to one or more intake valves (and/or exhaust valves) to enable the positive valve overlap. By increasing positive valve overlap, boosted air from downstream of the compressor can be delivered through the given cylinder to the exhaust manifold and the exhaust turbine without being combusted. Herein, turbine spool-up may be expedited to enable higher boost pressures. In another example, if lower boost pressure is desired, negative valve overlap may be provided by adjusting the valve timings. Herein, overlap between the intake valve(s) and the exhaust valve(s) may be reduced, e.g., minimized, such that boosted air is not provided via blow-through to the exhaust turbine via the given cylinder.

Next, at 312, routine 300 estimates the pre-turbine exhaust pressure. As such, routine 400 of FIG. 4 may be activated to model the exhaust pressure upstream of the exhaust turbine. It will be appreciated that the pre-turbine exhaust pressure is a predicted pressure. Specifically, the pre-turbine exhaust pressure may not be estimated or measured by a sensor. Instead, the pre-turbine exhaust pressure may be modeled based on a plurality of engine and vehicle parameters such as air flow, spark timing, vehicle speed, air-fuel ratio, etc. as will be detailed below in reference to FIG. 4.

Routine 300 then continues to 314 to determine if the predicted pre-turbine exhaust pressure is higher than a threshold, Thr_P. The threshold, Thr_P, may be based, in one example, on a pressure that will force open (and hold open) one or more exhaust valves of the plurality of cylinders in the engine when the one or more exhaust valves would be otherwise closed. As such, the exhaust valves when closed may include an exhaust cam on its base circle while an associated spring(s) of the exhaust valve(s) hold the exhaust valve(s) closed. To elaborate, the threshold may be based upon an exhaust pressure upstream of the exhaust turbine that would force open the exhaust valve(s) from its (their) closed position. As an example, during a power stroke in a cylinder of the engine, the intake valve(s) and the exhaust valve(s) may be fully closed. An estimate of exhaust pressure that may force the exhaust valve(s) open during the power stroke may be used to determine Thr_P.

In another example, Thr_P may be additionally or alternatively based upon wear of a spring of the one or more exhaust valves of the plurality of cylinders over the life of the engine. As an example, springs coupled to the one or more exhaust valves may degrade over the life of the engine affecting a degree of closure of the exhaust valves. For example, exhaust valve springs in an engine that is older may have more wear and a lower spring constant than exhaust valve springs in a relatively newer engine. Herein, a lower exhaust pressure may force open exhaust valves coupled to the springs with higher amount of wear. Accordingly, the threshold Thr_P may also account for degradation of the springs coupled to the exhaust valves.

Further still, the threshold Thr_P may be based on engine speed. In another example, threshold Thr_P may be based on intake manifold pressure (MAP). Additionally, the threshold Thr_P may be based on a position of cams associated with intake and/or exhaust valves. Changes to cam timing may cause variations in in-cylinder pressure. Specifically, cam timing can affect minimum and maximum cylinder pressures. Consequently, unintentional opening of exhaust valves may be affected by varying cam timing.

If it is determined at 314 that exhaust pressure upstream of the exhaust turbine is lower than the threshold Thr_P, routine 300 proceeds to 316 to maintain existing engine operation. For example, one or more actuators may be maintained in their positions. Alternatively, one or more actuators may be adjusted to maintain engine operation. Routine 300 then ends.

If, however, the modeled pre-turbine exhaust pressure is determined to be at or higher than the threshold, routine 300 continues to 318 to reduce air flow into the engine. By reducing intake air flow into the engine, pre-turbine exhaust pressure may be lowered. Intake air flow into the engine may be reduced by adjusting the intake throttle while maintaining valve timing (e.g., without adjusting valve timing). For example, intake air flow may be lowered by reducing an opening of the intake throttle at 320. In one example, the intake throttle may be adjusted to a mostly closed position (e.g., a less open position) from a mostly open position. Herein, the controller may send a control signal to an electromechanical actuator coupled to the intake throttle in the intake system to rotate the intake throttle to the mostly closed position from the mostly open position. In another example, the opening of the intake throttle may be decreased by shifting the intake throttle from a fully open position to a position midway between fully closed and fully open. As such, the opening of the intake throttle may be reduced without actuating the VCT system to alter valve timings. Herein, the position of the intake throttle may be altered without adjusting existing valve overlap.

Optionally, at 322, the VCT system may be adjusted to reduce intake air flow into the engine. Herein, the VCT system may be modified to reduce positive valve overlap thereby decreasing an amount of boosted blow-through air flowing through one or more cylinders into the exhaust turbine. As such, the VCT system may be adjusted if engine conditions do not permit a change in the position of the intake throttle towards a more closed position where intake airflow to the engine is reduced. For example, the engine may be operating at lower speeds (e.g., lower than a speed threshold) and at higher engine loads (e.g., higher than a load threshold). Herein, the throttle position may be limited or constrained. As one non-limiting example, if the vehicle is operating at lower engine speeds and the intake throttle is in a mostly closed position, the throttle may not be moved to a still more closed position. Instead, valve timing may be altered to achieve the reduced intake air flow. Specifically, intake valve and/or intake cam timings of one or more cylinders may be adjusted by the VCT system to reduce intake air flow into the corresponding cylinders. Further, blow-through of boosted air through the cylinder(s) may also be reduced. Herein, positive (intake to exhaust) valve overlap between the intake valve and the exhaust valve of one or more cylinders may be modified (e.g., reduced) to reduce intake air flow into the cylinders and reduce blow-through of boosted air.

Though not shown in routine 300, HP-EGR may also be reduced in response to detecting excessive exhaust pressures in the pre-turbine region. Herein, HP-EGR flow may be reduced (e.g., by reducing an opening of the HP-EGR valve 86 in FIG. 1) and/or discontinued in addition to adjusting the position of the intake throttle. It will be appreciated that reducing the HP-EGR flow may have a slower effect on pre-turbine exhaust pressure relative to reducing intake air flow via closing the intake throttle.

Further, at 324, routine 300 includes maintaining boost levels. As such, boost levels may be maintained while the intake air flow is lowered. At 326, the opening of the wastegate may be reduced to maintain boost pressures. As one example, the wastegate may be adjusted to a fully closed position from a mostly open position enabling a higher amount of exhaust to spin the exhaust turbine. Alternatively, the wastegate may be moved to the fully closed position from a mostly closed position. In another example, the wastegate may be shifted to the mostly closed position from a less closed position. Additionally or alternatively, the CRV may be adjusted to a position that decreases the opening of the CRV at 328. For example, the CRV may be adjusted to a fully closed position from a mostly open position. In another example, the CRV may be transitioned to the fully closed position from a mostly closed position such that a lower amount of compressed air is diverted away from the intake throttle via the compressor bypass passage. In yet another example, the CRV may be shifted to the mostly closed position from a less closed position.

Next, at 330, a timer may be started to monitor a duration from when intake air flow is reduced. Specifically, the duration since reducing the opening of the intake throttle may be monitored. Optionally, a duration since reducing intake air flow via adjusting valve timing may be tracked. The timer may monitor a number of combustion events since reducing the opening of the intake throttle. In another example, the timer may monitor a duration of vehicle travel since reducing intake air flow. In yet another example, the timer may monitor a distance of vehicle travel. At 332, routine 300 may determine if a threshold duration, Thr_D, has elapsed. In one example, the threshold duration may be a threshold number of combustion events since adjusting the opening of the intake throttle in response to pre-turbine exhaust pressure exceeding the threshold Thr_P. In another example, threshold duration Thr_D may be a threshold duration of vehicle travel after reducing intake air flow. For example, a threshold duration of vehicle travel may be 60 seconds. In another example, the threshold duration of vehicle travel may be 30 seconds. In yet another example, the threshold duration Thr_D may be a threshold distance of vehicle travel. For example, Thr_D may be 500 ft. In another example, the threshold distance of vehicle travel after reducing the opening of the intake throttle in response to pre-turbine exhaust pressure exceeding the threshold Thr_P may be 200 ft.

If at 332 it is determined that the threshold duration since reducing the opening of the intake throttle in response to pre-turbine exhaust pressure exceeding the threshold Thr_P is not elapsed, routine 300 continues to 334 to maintain the reduced opening of the intake throttle. As such, the controller may send a signal to the electromechanical actuator coupled to the intake throttle to hold the intake throttle at its position assumed at 320. Routine 300 then returns to 332.

On the other hand, if it is determined at 332 that the threshold duration Thr_D has elapsed, routine 300 proceeds to 336 to confirm if the pre-turbine exhaust pressure has reduced below the threshold, Thr_P. If yes, routine 300 progresses to 338 to adjust the position of the intake throttle based on existing operating conditions and then ends. In other words, the intake throttle is held at a position that reduces intake air flow until pre-turbine exhaust pressure reduces below the threshold, Thr_P. Once the pre-turbine exhaust pressure is lower than the threshold, the intake throttle is restored to a position desirable for existing engine operating conditions. In one example, if the engine is operating with higher boost levels, the opening of the intake throttle may be increased at 338. In another example, if the engine is operating with a lower torque demand, the intake throttle may be adjusted to a more closed position. As such, there may be situations wherein the position of the intake throttle may not be changed at 338 if the intake air flow entering the intake manifold is that desired by existing engine conditions.

However, if it is determined at 336 that the pre-turbine exhaust pressure remains higher than the threshold (Thr_P), routine 300 continues to 340 to reduce boost levels. Thus, boost levels may be decreased only after the threshold duration of reduced intake air flow is surpassed. Accordingly, at 342, an opening of the wastegate is increased to allow a larger proportion of exhaust gases to bypass the exhaust turbine. In one example, the controller may communicate a control signal to the electromechanical actuator coupled to the wastegate to adjust the position of the wastegate from a mostly closed position to a mostly open position. In another example, the wastegate may be adjusted from a fully closed position to a mostly open position. In yet another example, the wastegate may be shifted to a fully open position from the fully closed position. Further, at 344, an opening of the CRV is also increased to divert a greater portion of compressed air from downstream of the compressor to upstream of the compressor. Thus, the CRV may be opened in addition to opening the wastegate in response to pre-turbine exhaust pressure remaining higher than the threshold even after the threshold duration has elapsed. The controller may communicate a control signal to the electromechanical actuator coupled to the CRV to adjust the position of the CRV from a mostly closed position to a mostly open position. It will be noted that in other examples, the CRV may be opened as an alternative to opening the wastegate to reduce pre-turbine exhaust pressure and boost levels. By opening (e.g., increasing the opening) one or more of the wastegate and the CRV, boost levels may be decreased.

Next, at 346, routine 300 maintains reduced boost levels until the pre-turbine exhaust pressure is lower than the threshold, Thr_P. Maintaining reduced boost levels may include maintaining the increased opening of each of the wastegate and the CRV. Specially, the positions of the wastegate and the CRV attained at 342 and 344 may be maintained until exhaust pressure upstream of the exhaust turbine is lower than the threshold. As such, once the pre-turbine exhaust pressure is below the threshold, boost levels may be adjusted (e.g., restored) based on existing engine conditions. Further still, the intake throttle (and valve timings) may be adjusted based on existing engine conditions once the pre-turbine exhaust pressure is lower than the threshold. Routine 300 then ends.

In this manner, excessive pre-turbine exhaust pressures may be decreased while concurrently reducing a likelihood of misfires, knocking, etc. in the engine. Intake air flow may be reduced responsive to detecting higher than desired pre-turbine exhaust pressures. The intake throttle may be adjusted to a more closed position, at first, to reduce intake air flow into the engine. If an opening of the intake throttle cannot be decreased, optionally, valve timing may be adjusted to reduce intake air flow. Concurrently, boost levels may be maintained by closing the wastegate and/or the CRV. If the pre-turbine exhaust pressure does not decrease within a threshold duration after reducing intake air flow (e.g., by adjusting the intake throttle), boost levels may be lowered in addition to reducing intake air flow.

It will be appreciated that intake air flow control via the intake throttle may produce a target intake manifold pressure. Further, adjustments to the intake throttle may function as a primary remedial action to excessive exhaust pressures since the intake throttle can rapidly control intake air flow. Meanwhile, modifications to valve timing and boost levels may function as secondary remedial actions as these modifications may effect slower changes to intake air flow. In other words, adjustments to valve timing via the VCT system and/or modifying boost levels via boost actuators may not cause rapid changes in intake air flow.

FIG. 4 depicts example routine 400 for modeling the pre-turbine exhaust pressure based on a plurality of engine and vehicle parameters. Specifically, a controller, such as controller 12, may predict pre-turbine exhaust pressure based on a model instead of measuring the pre-turbine exhaust pressure via a sensor. As such, costs may be lowered via component reduction. Routine 400 will be described in relation to the engine system shown in FIG. 1, but it should be understood that similar routines may be used with other systems without departing from the scope of this disclosure. Instructions for carrying out routine 400 may be executed by a controller, such as controller 12 of FIG. 1, based on instructions stored on a memory of the controller and in conjunction with signals received from sensors of the engine system, such as the sensors described above with reference to FIG. 1.

At 404, routine 400 includes receiving data regarding engine air flow (e.g., intake air flow), exhaust flow e.g., flow rate of exhaust gases, spark timing, air-fuel ratio, cam timing, intake manifold pressure (e.g., MAP), intake manifold temperature, and vehicle speed. Specifically, output from various sensors may be received by the controller. For example, a measure of intake air flow may be received from the MAF sensor. As another example, measurements of the intake manifold temperature may be received from a sensor such as MAT sensor 127 of FIG. 1.

Next, at 406, additional output regarding post-turbine exhaust pressure is received. Herein, a pressure sensor, such as pressure sensor 54 in FIG. 1, may measure the exhaust pressure existing downstream of the exhaust turbine. Further, at 408, routine 400 includes receiving data regarding the soot loading of the particulate filter in the exhaust conduit. For example, a particulate matter sensor, such as sensor 162 of FIG. 1, may communicate an estimate of loading of the particulate filter, such as particulate filter 72 in FIG. 1. As such, a higher exhaust backpressure may be produced upstream of the exhaust turbine by a higher loading of the particulate filter. As explained earlier, the particulate filter may trap soot particles and/or ash particles which may increase the loading of the particulate filter.

At 410, routine 400 includes receiving estimates or measurements of boost levels. For example, the controller may receive output from a throttle inlet pressure (TIP) sensor, such as TIP sensor 129 of FIG. 1 as a measure of existing boost levels. At 412, routine 400 includes modeling the pre-turbine exhaust pressure based on the data received at 404, 406, 408, and 410. Thus, the pre-turbine exhaust pressure is predicted based on soot loading of the particulate filter, boost levels, post-turbine exhaust pressure, engine air flow, intake manifold pressure, intake manifold temperature, vehicle speed, air-fuel ratio, exhaust flow, cam timing, and spark timing.

Accordingly, an example method for an engine may comprise adjusting an intake throttle responsive to pre-turbine exhaust pressure greater than a threshold, such as Thr_P of routine 300, without reducing boost level and while maintaining valve timing. As such, the pre-turbine exhaust pressure may be a predicted pressure, and the pre-turbine exhaust pressure may be modeled based on a post-turbine exhaust manifold pressure. Further, the post-turbine exhaust manifold pressure may be estimated by an exhaust pressure sensor. The engine may include a soot filter coupled downstream of a turbocharger turbine, and the pre-turbine exhaust pressure may be further modeled based on soot load of the soot filter and the boost level. Further still, the pre-turbine exhaust pressure may be modeled based on one or more engine air flow, exhaust flow, spark timing, air-fuel ratio, cam timing, manifold temperature, manifold pressure, and vehicle speed.

It will be noted that the adjusting may include reducing an opening of the intake throttle until the pre-turbine exhaust pressure is below the threshold, wherein the threshold is based on a pressure required to force open a closed exhaust valve. The adjusting may include reducing an opening of the intake throttle for a threshold duration, and responsive to the pre-turbine exhaust pressure remaining greater than the threshold after the threshold duration, reducing boost level by adjusting an exhaust wastegate. Alternatively or additionally, a compressor recirculation valve (CRV) may also be adjusted. The adjusting may further include reducing the opening of the intake throttle while closing the exhaust wastegate. The adjusting may also include reducing the opening of the intake throttle while closing the CRV to maintain boost levels. The engine may be coupled in a vehicle, such as vehicle system 6 of FIG. 1, and the threshold duration may include one of a threshold number of engine combustion events, a threshold duration of vehicle travel, and a time taken for a threshold distance of vehicle travel. Reducing the boost level by adjusting the exhaust wastegate may include increasing an opening of the exhaust wastegate to reduce the boost level until the pre-turbine exhaust pressure is lower than the threshold. As shown in routine 300, boost levels may also be reduced by increasing the opening of the CRV in addition or as an alternative to increasing the opening of the wastegate.

Turning now to FIG. 5, an example map 500 is shown illustrating adjustments to an intake throttle of an engine, such as engine system 100 of FIG. 1, included in a vehicle, responsive to excessive exhaust pressures. As such, map 500 will be described in relation to the system shown in FIG. 1. Map 500 depicts pre-turbine exhaust pressure at plot 502, loading of a soot filter, such as soot filter 72 of FIG. 1, at plot 504, intake air flow at plot 506, position of the intake throttle at plot 508, boost pressure at plot 510, status of a wastegate (e.g., open, closed or therebetween) at plot 512, and pedal position (PP) at plot 514. Line 501 represents the threshold, Thr_P, for pre-turbine exhaust pressure while line 503 represents a loading threshold of the soot filter. As such, line 503 is shown for the sake of elucidating a rise in pre-turbine exhaust pressure and the loading threshold may or may not be used without departing from the scope of the present disclosure. All plots are shown over time, along the x-axis. Further, time increases from the left of the x-axis towards the right. Note that elements aligning at a common time on the graph, such as at time t1, for example, are occurring concurrently, including for example where one parameter is increasing while another parameter is decreasing.

Prior to t1 (e.g., between t0 and t1), the engine may be operating un-boosted with the accelerator pedal at released (plot 514). For example, the engine may be idling. The wastegate may be mostly open (e.g., at fully open position) enabling a substantial amount of exhaust gases to bypass the exhaust turbine. The intake throttle may be significantly closed (e.g., within 1% of fully closed) and a nominal intake air flow may be present. As such, at engine idle, a considerably lower intake air flow rate may be present (plot 506). Exhaust pressure upstream of the exhaust turbine (plot 502) may be lower while the loading of the soot filter may be moderately high.

At t1, the pedal is fully depressed as a tip-in event is initiated by a vehicle operator. Torque demand (not shown) may rise abruptly due to the tip-in and in response to the tip-in, the intake throttle is adjusted to a more open position from the mostly closed position prior to t1. As an example, the intake throttle may be adjusted to fully open position at t1 enabling a significant increase in intake air flow into the engine. Additionally, the wastegate is adjusted from the more open position at t0 to a mostly closed position at t1 in response to the tip-in event. Accordingly, boost pressure rises steadily past t1 producing a gradual increase in pre-turbine exhaust pressure. As described earlier in reference to FIG. 4, pre-turbine exhaust pressure may be based on boost levels as well as loading of the soot filter in addition to other parameters. Additional exhaust gas flow into the soot filter between t1 and t2 causes an increase in the loading of the soot filter. As the loading of the soot filter increases, the pre-turbine exhaust pressure concurrently rises and crosses the threshold (line 501) at t2. As such, the soot filter loading also surpasses the loading threshold (line 503) at t2.

Thus, at t2, responsive to the increase in pre-turbine exhaust pressure to higher than the threshold (line 501), intake air flow may be reduced. In order to reduce intake air flow, at t2, an opening of the intake throttle is decreased by shifting the intake throttle from the more open position at t1 to a less open position at t2. Reducing the opening of the intake throttle can lower the intake air flow relatively quickly, as shown at t2 in plot 506. As such, intake airflow reduces promptly with the decrease in the opening of the intake throttle. At the same time, desired boost levels are maintained by decreasing the opening of the wastegate at t2. For example, the wastegate may be adjusted from the mostly closed position at t1 to a fully closed position at t2. In another example, the wastegate may be transitioned from a position halfway between fully open and fully closed to a position that is relatively more closed. Thus, all the exhaust from the engine may be directed to the exhaust turbine. Though not shown, a compressor bypass valve (or compressor recirculation valve) may also be adjusted to a more closed position to maintain boost levels. Accordingly, boost pressure may not vary between t2 and t3.

The intake throttle may be maintained at its more closed position of t2 for a threshold duration, T_D, shown in map 500. T_D may be the same as Thr_D of routine 300. The threshold duration may be the duration between t2 and t3. Further, the threshold duration may be one of a threshold number of engine combustion events, a threshold duration of vehicle travel, and a time taken for a threshold distance of vehicle travel.

The reduction in intake air flow may lower the pre-turbine exhaust pressure as shown between t2 and t3. Further, the pre-turbine exhaust pressure reduces to lower than the threshold at t3. Since the pre-turbine exhaust pressure decreases to below the threshold within the threshold duration, T_D, boost levels may be maintained at desired levels. Further, in response to the pre-turbine exhaust pressure reducing to below the threshold at t3, the intake throttle is adjusted from its more closed position at t2 to a position based on the existing operating conditions at t3. As shown, the pedal remains fully depressed at t3. Accordingly, the intake throttle may be adjusted to the fully open position at t3 enabling an increase in the opening of the intake throttle and resulting in a corresponding increase in intake air flow. Further, the opening of the wastegate may be increased by shifting the wastegate to the mostly closed position from the fully closed position assumed at t2. In other words, the wastegate may be adjusted to a more open position from a less open position. As such, the position of the wastegate may be restored to that at t1 since the existing engine conditions continue to include a higher boost pressure.

At t4, the current engine cycle (e.g., from t0 until t4) ends. Between t4 and t5, a plurality of different engine cycles may occur. Thus, the engine cycle between t5 and t8 may occur after a considerable duration from t4. The soot filter may have been regenerated between t4 and t5 such that its load at t5 is about the same as that at t0. Further, the engine may be operating with moderately high levels of boost with the pedal mostly depressed. To elaborate, the desired boost pressure at t5 may be slightly lower than the boost pressure desired between t1 and t4. Similarly, the pedal position at t1 may be more depressed than that at t5. The wastegate may be at a more closed position to enable the moderately higher levels of boost pressure. Furthermore, the intake throttle may be mostly open allowing a higher intake air flow. However, since the desired boost level is lower than that between t1 and t4, the intake air flow may be slightly lower than that provided from t1 to t2.

Between t5 and t6, loading of the soot sensor increases towards the loading threshold and attains the loading threshold at t6. The moderately higher boost pressures and the higher loading of the soot filter may cause the pre-turbine exhaust pressure to increase to higher than the threshold (line 501) at t6. Other engine parameters may also affect the rise in pre-turbine exhaust pressure. In response to the pre-turbine exhaust pressure being higher than the threshold, the intake throttle is adjusted to a more closed position at t6 relative to the intake throttle position at t5. The decrease in opening of the intake throttle produces a reduction in intake air flow at t6. Further, boost pressure may be maintained at desired levels by adjusting the wastegate to a more closed position at t6 relative to that at t5.

Between t6 and t7, the threshold duration may elapse. However, the pre-turbine exhaust pressure remains higher than the threshold even after the threshold duration, T_D, is passed at t7. Accordingly, boost levels are reduced at t7 by adjusting the wastegate. Specifically, boost levels may be decreased by increasing the opening of the wastegate. As shown, the wastegate is adjusted from the more closed position towards a more open position (or a less closed position). In another example, the wastegate may be transitioned from a fully closed position to a more open position. In addition (or as an alternative) to adjusting the wastegate, the opening of the CRV may also be increased to reduce boost levels. The ensuing reduction in boost levels helps lower the pre-turbine exhaust pressure and at t8, pre-turbine exhaust pressure decreases to below the threshold (line 501). Consequently, the intake throttle, the wastegate, and the CRV may each be adjusted to other positions based on existing engine conditions. As shown, since the pedal position remains largely depressed, the intake throttle is restored at t8 to its mostly open position of t5. Further, the wastegate is adjusted to the more closed position at t8 decreasing the opening of the wastegate. Though not shown, the opening of the CRV may also be decreased in response to the pre-turbine exhaust pressure reducing to below the threshold and the pedal position at t8. Thus, lowered boost levels may be held until the pre-turbine exhaust pressure is lower than the threshold. Thereafter, boost actuators may be adjusted according to existing engine conditions.

Figure 6:
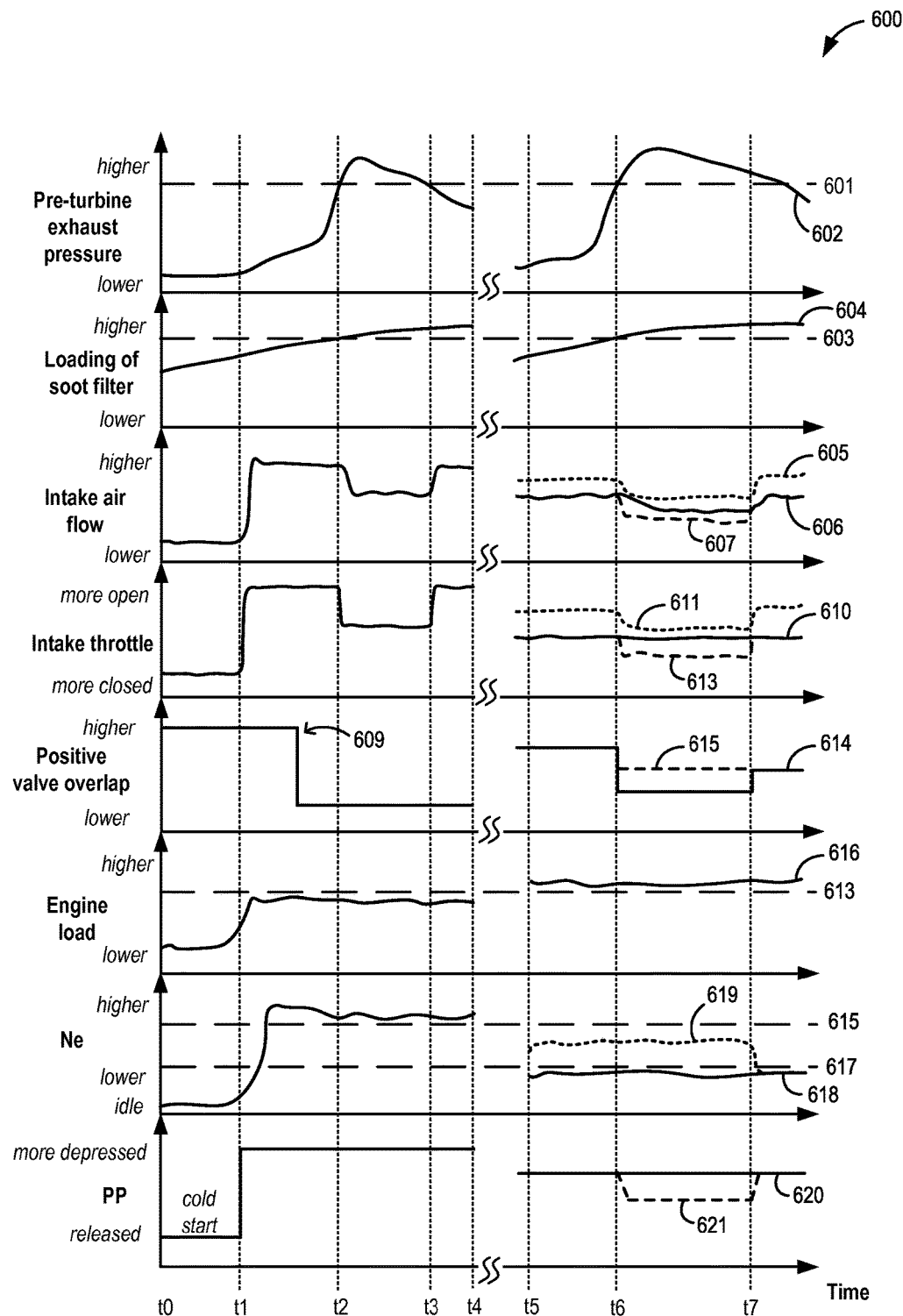
FIG. 6 illustrates additional adjustments to air flow via regulating positive valve overlap and/or a position of the intake throttle responsive to excessive exhaust pressures.

FIG. 6 depicts map 600 illustrating adjustments to intake air flow via one or more of modifications to the intake throttle position and positive valve overlap between an intake valve and an exhaust valve. As such, map 600 will be described in relation to the system shown in FIG. 1. Map 600 depicts pre-turbine exhaust pressure at plot 602, loading of a soot filter, such as soot filter 72 of FIG. 1, at plot 604, intake air flow at plot 606, position of the intake throttle at plot 610, positive valve overlap at plot 614, engine load at plot 616, engine speed (Ne) at plot 618, and pedal position (PP) at plot 620. Line 601 represents the threshold, Thr_P, for pre-turbine exhaust pressure while line 603 represents a loading threshold of the soot filter. As such, line 603 is shown for the sake of elucidating a rise in pre-turbine exhaust pressure and the loading threshold may or may not be used without departing from the scope of the present disclosure. Line 613 represents a threshold load, line 615 represents a first speed threshold, and line 617 represents a second speed threshold. As such, the second speed threshold may be lower than the first speed threshold as depicted. All plots are shown over time, along the x-axis. Further, time increases from the left of the x-axis towards the right. Note that elements aligning at a common time on the graph, such as at time t1, for example, are occurring concurrently, including for example where one parameter is increasing while another parameter is decreasing.

It will also be noted that positive valve overlap at plot 614 represents positive intake to exhaust valve overlap as described earlier in reference to FIG. 1. As such, positive valve overlap between an intake valve and an exhaust valve of a given cylinder may be higher when the intake valve and exhaust valve are open concurrently for a longer duration. Positive valve overlap between the intake valve and exhaust valve may be lower when the intake valve and exhaust valve are concurrently open for a shorter duration. In some examples, a lower positive valve overlap may also indicate a negative valve overlap.

At t0, pedal position (e.g., accelerator pedal) may be fully released and the engine may be idling (as shown by plot 618 being at idle speed). For example, a cold engine start may have occurred. During engine idle between t0 and t1, intake air flow may be lower as the intake throttle may be at a more closed position and engine load may be lower. Positive valve overlap may be higher to expedite attainment of catalyst light-off temperature. As such, the engine may be operating such that the intake valve(s) and the exhaust valve(s) in one or more cylinders are open at the same time (e.g., between exhaust stroke and ensuing intake stroke) allowing intake air to blow-through the one or more cylinders to the exhaust conduit. Loading of the soot filter may be moderately high at t0 and the pre-turbine exhaust pressure may be lower during engine idle.

At t1, a tip-in event occurs as the pedal is fully depressed. In response to the tip-in event, engine speed rises sharply and there is an increase in engine load. As such, engine speed may now be higher than the first speed threshold (line 615). However, engine load remains below the threshold load (line 613). In order to provide the desired torque demand, the intake throttle is shifted to a more open position relative to that at idle. For example, the intake throttle may now be fully open (from a mostly closed position) to enable a higher intake air flow rate. Accordingly, as plot 606 depicts, the intake air flow into the engine increases rapidly in response to the increased opening of the intake throttle. Positive valve overlap is maintained at its higher setting (via control signals from a controller to the VCT systems) to expedite turbine spin-up for the tip-in event as well as for enabling catalyst light-off. The higher positive valve overlap may enable compressed intake air to be directed from downstream of the compressor to upstream of the exhaust turbine via the cylinders to provide extra mass flow to spin-up the exhaust turbine at t1. Once turbocharger spool up has been achieved, positive valve overlap may be reduced, as shown at 609. However, a higher torque demand may continue as depicted by the pedal position and higher engine speed. The higher torque demand may produce a gradual increase in pre-turbine exhaust pressure between t1 and t2. As engine operation continues between t1 and t2, soot loading of the soot filter increases steadily until at t2, the loading threshold is reached. Further still, as the soot loading increases, the pre-turbine exhaust pressure simultaneously rises to cross the threshold, Thr_P represented by line 601, at t2.

In response to pre-turbine exhaust pressure being higher than the threshold, the intake air flow may be reduced. In order to reduce intake air flow at a faster rate, the intake throttle may be adjusted to provide a reduced opening to intake air. Specifically, the intake throttle is shifted to a more closed position at t2 from a more open position at t1. As an example, the intake throttle may be adjusted to the more closed position from a less closed position. As another example, the intake throttle may be moved from a fully open position to a position halfway between fully open and fully closed at t2. Herein, as the engine speed is higher than the first speed threshold, only the intake throttle may be adjusted to counter excessive exhaust pressure. Further, positive valve overlap may be lower once turbocharger spool up has been completed. Accordingly, positive valve overlap is maintained (at the overlap at 609) and therefore, neither intake valve timing, nor intake cam timing may be changed at t2. As noted earlier, valve timing modifications may have a slower response on intake air flow, and accordingly may be used as a secondary remedial action (e.g., only if engine conditions do not permit changes to intake throttle position).

Pre-turbine exhaust pressure gradually decreases responsive to the reduction in intake air flow between t2 and t3 such that pre-turbine exhaust pressure is lowered to below the threshold at t3. Accordingly, at t3, the intake throttle may be returned to its previous position e.g., that at t1, while positive valve overlap may be lowered as the catalyst may have attained light-off temperatures. The intake throttle may be adjusted to a different position based on existing engine conditions upon pre-turbine exhaust pressure reducing below the threshold. At t4, the engine drive cycle that commenced at t0 ends.

Between t4 and t5, a long duration may ensue wherein multiple different engine drive cycles may occur. At t5, a distinct engine drive cycle may be occurring wherein the pedal position is depressed, but not fully depressed as between t1 and t4. Herein, engine speed may be lower than the second speed threshold (line 617) but engine load may be higher than the load threshold (line 613). For example, an air-conditioner may be activated. Further, positive valve overlap may be moderate. Further still, intake air flow may be at a medium level (plot 610) as the intake throttle is about halfway open (or half closed) e.g., halfway between fully open and fully closed for enabling the desired engine speed and load. Soot loading on the soot filter is higher and the exhaust pressure upstream of the exhaust turbine is lower. Between t5 and t6, the positions of the pedal and intake throttle are maintained (e.g., no change) but soot loading continues to increase with engine operation. Accordingly, pre-turbine exhaust pressure rises and surpasses the threshold at t6.

The intake throttle being positioned at half-open may provide a desired intake air flow into the engine based on each of the pedal position, engine load higher than the load threshold (line 613) and engine speed below the second speed threshold (line 617) at t6. Herein, engine conditions (e.g., pedal position) may not permit a reduction in opening of the intake throttle. As such, the intake throttle cannot be adjusted to a more closed position to reduce intake air flow in response to the pre-turbine exhaust pressure exceeding the threshold. Accordingly, a secondary remedial action of reducing positive valve overlap may be initiated at t6 to reduce intake air flow. As shown by plot 614, positive valve overlap is lowered at t6 by adjusting one or more of intake valve timing, intake cam timing, exhaust valve timing, and exhaust cam timing. Consequently, the amount of blow-through of compressed (or boosted) air from downstream of the compressor to the exhaust conduit may be decreased enabling a reduction in intake air flow into the engine. It will be understood that adjustments to positive valve overlap may be secondary to adjusting the intake throttle responsive to pre-turbine exhaust pressures exceeding the threshold.

It will be appreciated that if engine conditions permit a change in intake throttle position at t6, intake air flow may be reduced by a combination of adjustments to the intake throttle and the positive valve overlap. For example, positive valve overlap may be reduced by a smaller amount, as shown by dashed line 615 (relative to solid line 614) between t6 and t7. At the same time, the opening of the intake throttle may be reduced to a smaller degree (relative to the decrease in opening at t2) as shown by dashed line 613 between t6 and t7. Herein, the intake throttle may be adjusted to a more closed position from a more open position e.g. from a fully open position. The combination of modifications may reduce intake air flow by a higher amount as indicated by dashed line 607 between t6 and t7.

In another example, if engine speed is higher than the second speed threshold but lower than the first speed threshold prior to t6, as shown by plot 619 (small dashes), and engine load is higher than the load threshold, the intake throttle may be at a slightly more open position between t5 and t6, as shown by plot 611 (small dashes). As such, plot 611 depicts variation in the position of the intake throttle if engine speed is between the first speed threshold and the second speed threshold, as shown by plot 619. Plot 605 (small dashes) portrays variation in the intake air flow if intake throttle position is that shown by plot 611. Since the engine speed is between the first speed threshold and the second speed threshold, intake air flow into the engine may be higher than that (plot 610 between t5 and t7) when engine speed is lower than the second threshold (plot 618 between t5 and t7). In this case, each of the intake throttle and positive valve overlap may be adjusted in parallel to mitigate excessive exhaust pressure observed at t6. Accordingly, at t6, intake air flow may be reduced by adjusting the intake throttle at t6 to a more closed position from that at t5 (plot 611). Positive valve overlap may be reduced concurrently to decrease intake air flow (as shown by plot 614).

Accordingly, during a first condition (e.g., when engine speed is higher than the first threshold), only the intake throttle may be adjusted to reduce intake air flow in response to pre-turbine exhaust pressure being higher than Thr_P. During a second condition, such as when engine speed is lower than the second threshold and engine load is higher than the load threshold, only positive valve overlap may be utilized to decrease intake air flow. During a third condition, such as when engine speed is between the first speed threshold and the second speed threshold while engine load is higher than the load threshold, both the intake throttle and positive valve overlap may be used in combination to reduce intake air flow. Returning to map 600, in response to the reduction in positive valve overlap at t6, intake air flow may reduce gradually (e.g., contrary to a faster response with adjustments to intake throttle opening at t2) as shown by plot 606 between t6 and t7. Further, pre-turbine exhaust pressure may also decrease and fall below the threshold at t7. Therefore, at t7, various actuators may be adjusted based on existing engine conditions. As an example, positive valve overlap may be increased slightly from that between t6 and t7 (solid line). In response to the increase in positive valve overlap, intake air flow may increase at t7 (albeit gradually).

Thus, an example engine system may comprise an engine including an intake and an exhaust, an engine cylinder including an intake valve and an exhaust valve, a turbocharger for providing a boosted intake airflow, the turbocharger including an exhaust turbine, an intake throttle, an exhaust wastegate, an intake cam for adjusting an intake valve timing, a particulate filter coupled downstream of the turbine, and a pressure sensor coupled downstream of the turbine. In the preceding example, the example system may additionally or optionally also include a controller with computer readable instructions stored on non-transitory memory for operating the engine with boost enabled and with positive valve overlap to blow-through an amount of boosted air from the engine intake to the engine exhaust via an the engine cylinder, estimating exhaust pressure upstream of the turbocharger turbine based on soot loading of the particulate filter, and if the estimated exhaust pressure is greater than a threshold, reducing one or more of intake air flow via the intake throttle and the amount of blow-through boosted air. In any or all of the preceding examples, the reducing may additionally or optionally include only reducing intake air flow via the intake throttle when engine speed is higher than a first speed threshold, only reducing the amount of blow-through boosted air when engine speed is lower than a second speed threshold and engine load is higher than a load threshold, and reducing each of intake airflow via the intake throttle and the amount of blow-through boosted air when engine speed is between the first speed threshold and the second speed threshold and engine load is higher than the load threshold. Further, in any or all of the preceding examples, reducing the amount of blow-through boosted air may additionally or optionally include adjusting a timing of the intake cam to reduce the positive valve overlap between the intake valve and the exhaust valve.

In another example embodiment, a method for an engine may comprise treating engine exhaust gas with a particular filter, the particulate filter positioned downstream of a turbocharger turbine, estimating exhaust pressure upstream of the turbocharger turbine based on soot loading of the particulate filter, and reducing intake air flow if the estimated exhaust pressure is greater than a threshold. In the preceding example, the threshold may additionally or optionally be based on a pressure that will force open an exhaust valve when the exhaust valve would otherwise be closed. Further, in any or all of the preceding examples, the threshold may additionally or optionally also be based on a spring wear of the exhaust valve over a life of the engine. Additionally, in any or all of the preceding examples, the threshold may additionally or optionally also be based upon one or more of engine speed and intake manifold pressure. Further still, in any or all of the preceding examples, the threshold may additionally or optionally be based on cam timing. As such, in any or all of the preceding examples, reducing intake air flow may additionally or optionally include, during a first condition, reducing intake air flow via adjustments to an intake throttle opening, and during a second condition, reducing intake air flow via adjustments to an intake valve and/or intake cam timing.

An example method for an engine may comprise adjusting an intake throttle responsive to pre-turbine exhaust pressure greater than a threshold without reducing boost level and while maintaining valve timing. In the preceding example, the pre-turbine exhaust pressure may additionally or optionally be a predicted pressure. In any or all of the preceding examples, the pre-turbine exhaust pressure may be additionally or optionally modeled based on a post-turbine exhaust manifold pressure. In any or all of the preceding examples, the engine may additionally or optionally include a soot filter coupled downstream of a turbocharger turbine, and wherein the pre-turbine exhaust pressure may be additionally or optionally further modeled based on soot load of the soot filter and the boost level. In any or all of the preceding examples, the pre-turbine exhaust pressure may be additionally or optionally further modeled based on one or more of engine air flow, exhaust flow, spark timing, air-fuel ratio, cam timing, manifold temperature, vehicle speed, and manifold pressure. In any or all of the preceding examples, the post-turbine exhaust manifold pressure may be additionally or optionally estimated by an exhaust pressure sensor. In any or all of the preceding examples, the adjusting may additionally or optionally include reducing an opening of the intake throttle until the pre-turbine exhaust pressure is below the threshold, the threshold based on a pressure required to force open a closed exhaust valve. In any or all of the preceding examples, the adjusting may additionally or optionally include reducing an opening of the intake throttle for a threshold duration, and responsive to the pre-turbine exhaust pressure remaining greater than the threshold after the threshold duration, additionally or optionally reducing boost level by adjusting an exhaust wastegate. In any or all of the preceding examples, the adjusting may additionally or optionally further include reducing the opening of the intake throttle while closing the exhaust wastegate. In any or all of the preceding examples, the engine may be additionally or optionally coupled in a vehicle and wherein the threshold duration may additionally or optionally include one of a threshold number of engine combustion events, a threshold duration of vehicle travel, and a time taken for a threshold distance of vehicle travel. In any or all of the preceding examples, reducing the boost level by adjusting the exhaust wastegate may additionally or optionally include increasing an opening of the exhaust wastegate to reduce the boost level until the pre-turbine exhaust pressure is lower than the threshold.

In this way, higher than desired exhaust pressures may be lowered. The technical effect of lowering excessive exhaust pressures is that exhaust valves of cylinders may not be forced open when the exhaust valves are fully closed. Accordingly, issues such as misfires, pre-ignition, etc. may be reduced. By adjusting the intake throttle to reduce intake air flow in response to excessive exhaust pressures, a faster mitigating action may be initiated. Further still, boost levels may be maintained by actuating one or boost actuators while reducing intake air flow. By maintaining boost levels at desired levels, drivability may be improved and vehicle operator experience may not degrade.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
    adjusting an intake throttle responsive to pre-turbine exhaust pressure greater than a threshold without reducing boost level and while maintaining valve timing,
    wherein the threshold is based on a pressure required to force open a closed exhaust valve.

2. The method of claim 1, wherein the pre-turbine exhaust pressure is a predicted pressure.

3. The method of claim 2, wherein the pre-turbine exhaust pressure is modeled based on a post-turbine exhaust manifold pressure.

4. The method of claim 3, wherein the engine includes a soot filter coupled downstream of a turbocharger turbine, and wherein the pre-turbine exhaust pressure is further modeled based on soot load of the soot filter and the boost level.

5. The method of claim 4, wherein the pre-turbine exhaust pressure is further modeled based on one or more of engine air flow, exhaust flow, spark timing, air-fuel ratio, cam timing, manifold temperature, vehicle speed, and manifold pressure.

6. The method of claim 3, wherein the post-turbine exhaust manifold pressure is estimated by an exhaust pressure sensor.

7. The method of claim 1, wherein the adjusting includes reducing an opening of the intake throttle until the pre-turbine exhaust pressure is below the threshold.

8. The method of claim 7, wherein the adjusting includes reducing the opening of the intake throttle for a threshold duration, and responsive to the pre-turbine exhaust pressure remaining greater than the threshold after the threshold duration, reducing boost level by adjusting an exhaust wastegate.

9. The method of claim 8, wherein the adjusting further includes reducing the opening of the intake throttle while closing the exhaust wastegate.

10. The method of claim 8, wherein the engine is coupled in a vehicle and wherein the threshold duration includes one of a threshold number of engine combustion events, a threshold duration of vehicle travel, and a time taken for a threshold distance of vehicle travel.

11. The method of claim 10, wherein reducing the boost level by adjusting the exhaust wastegate includes increasing an opening of the exhaust wastegate to reduce the boost level until the pre-turbine exhaust pressure is lower than the threshold.

12. A method for an engine, comprising:
    treating engine exhaust gas with a particulate filter, the particulate filter positioned downstream of a turbocharger turbine;
    estimating exhaust pressure upstream of the turbocharger turbine based on soot loading of the particulate filter; and
    reducing intake airflow if the estimated exhaust pressure is greater than a threshold,
    wherein the threshold is based on a pressure that will force open an exhaust valve when the exhaust valve would otherwise be closed.

13. The method of claim 12, wherein the threshold is further based on a spring wear of the exhaust valve over a life of the engine.

14. The method of claim 12, wherein the threshold is further based on one or more of engine speed and intake manifold pressure.

15. The method of claim 12, wherein the threshold is further based on cam timing.

16. The method of claim 15, wherein reducing intake airflow includes, during a first condition, reducing intake airflow via adjustments to an intake throttle opening, and during a second condition, reducing intake airflow via adjustments to an intake valve and/or intake cam timing.

17. An engine system, comprising:
an engine including an intake and an exhaust;
an engine cylinder including an intake valve and an exhaust valve;
a turbocharger for providing a boosted intake airflow, the turbocharger including an exhaust turbine;
an intake throttle;
an exhaust wastegate;
an intake cam for adjusting an intake valve timing;
a particulate filter coupled downstream of the exhaust turbine;
a pressure sensor coupled downstream of the exhaust turbine; and
a controller with computer readable instructions stored on non-transitory memory for:
operating the engine with boost enabled and with positive valve overlap to blow-through an amount of boosted air from the intake to the exhaust via the engine cylinder;
estimating exhaust pressure upstream of the exhaust turbine based on soot loading of the particulate filter; and
if the estimated exhaust pressure is greater than a threshold, reducing one or more of intake airflow via the intake throttle and the amount of blow-through boosted air,
wherein reducing the amount of blow-through boosted air includes adjusting a timing of the intake cam to reduce the positive valve overlap between an intake valve and an exhaust valve.

18. The engine system of claim 17, wherein the reducing includes: only reducing intake airflow via the intake throttle when engine speed is higher than a first speed threshold, only reducing the amount of blow-through boosted air when the engine speed is lower than a second speed threshold and engine load is higher than a load threshold, and reducing each of intake airflow via the intake throttle and the amount of blow-through boosted air when the engine speed is between the first speed threshold and the second speed threshold and the engine load is higher than the load threshold.

* * * * *